US012282295B2

United States Patent
Wang et al.

(10) Patent No.: US 12,282,295 B2
(45) Date of Patent: Apr. 22, 2025

(54) HOLOGRAPHIC 3D DISPLAY SYSTEM BASED ON VIRTUAL ARRAY SPLICING OF SPATIAL LIGHT MODULATOR

(71) Applicant: BEIHANG UNIVERSITY, Beijing (CN)

(72) Inventors: Di Wang, Beijing (CN); Qionghua Wang, Beijing (CN); Zhaosong Li, Beijing (CN); Nannan Li, Beijing (CN); Yilong Li, Beijing (CN); Chao Liu, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 17/768,315

(22) PCT Filed: Aug. 5, 2021

(86) PCT No.: PCT/CN2021/111015
§ 371 (c)(1),
(2) Date: Apr. 12, 2022

(87) PCT Pub. No.: WO2023/000394
PCT Pub. Date: Jan. 26, 2023

(65) Prior Publication Data
US 2024/0103441 A1 Mar. 28, 2024

(30) Foreign Application Priority Data
Jul. 19, 2021 (CN) .......................... 202110812111.2

(51) Int. Cl.
G03H 1/26 (2006.01)
G02B 30/26 (2020.01)

(52) U.S. Cl.
CPC ............. *G03H 1/268* (2013.01); *G02B 30/26* (2020.01)

(58) Field of Classification Search
CPC ... G03H 1/268; G03H 2001/306; G02B 30/26
(Continued)

(56) References Cited

U.S. PATENT DOCUMENTS

| 10,031,338 B2 * | 7/2018 | Alexander ........... G03H 1/2645 |
| 2010/0014134 A1 * | 1/2010 | Cable ................... G03H 1/2205 |
| | | 359/9 |

(Continued)

FOREIGN PATENT DOCUMENTS

| CN | 101661265 A | 3/2010 |
| CN | 104698802 A | 6/2015 |

(Continued)

OTHER PUBLICATIONS

Chinese First Office Action dated Jan. 30, 2022 cited in Application No. 202110812111.2, 7 pgs.

(Continued)

*Primary Examiner* — Audrey Y Chang
(74) *Attorney, Agent, or Firm* — BEKIARES ELIEZER LLP

(57) ABSTRACT

A holographic 3D display system based on virtual array splicing of a spatial light modulator includes a laser configured to generate a coherent light beam, first, second and third beam splitters, first and second reflectors, a shutter array, a spatial filter array, a solid lens, first and second light beam deflection elements and a spatial light modulator. The first and second beam splitters and the first reflector are configured to split the light beam generated by the laser into three parallel light beams to irradiate the shutter array. The shutter array is configured to control the three parallel light beams to sequentially pass therethrough according to a set time sequence. The three parallel light beams passing through the shutter array are expanded and collimated by the spatial (Continued)

filter array and the solid lens to form three parallel light beams with the same size and uniform intensity.

1 Claim, 5 Drawing Sheets

(58) Field of Classification Search
USPC .......................................... 359/9, 15, 23, 32
See application file for complete search history.

(56) References Cited

U.S. PATENT DOCUMENTS

| | | | | |
|---|---|---|---|---|
| 2014/0300709 | A1* | 10/2014 | Futterer | H04N 13/32 348/51 |
| 2016/0378062 | A1* | 12/2016 | Watanabe | G03H 1/0808 359/9 |
| 2021/0098973 | A1* | 4/2021 | Gong | G02B 26/06 |

FOREIGN PATENT DOCUMENTS

| | | |
|---|---|---|
| CN | 108803295 A | 11/2018 |
| CN | 110750042 A | 2/2020 |
| CN | 111399356 A | 7/2020 |
| CN | 111580372 A | 8/2020 |
| CN | 112649962 A | 4/2021 |
| WO | 2021017981 A1 | 2/2021 |

OTHER PUBLICATIONS

Chinese International Search Report and Written Opinion dated Mar. 28, 2022 cited in Application No. PCT/CN2021/111015 with Chinese First Search of Priority Document cited in Application No. 2021108121112, 10 pgs.

* cited by examiner

HOLOGRAPHIC 3D DISPLAY SYSTEM BASED ON VIRTUAL ARRAY SPLICING OF SPATIAL LIGHT MODULATOR

CROSS-REFERENCE TO RELATED APPLICATION

The present application is a U.S. National Stage under 35 U.S.C. § 371 of International Application No. PCT/CN2021/111015, filed on Aug. 5, 2021, which claims the benefit of the Chinese Patent Application No. CN202110812111.2, filed on Jul. 19, 2021 with the Chinese Patent Office, and entitled "Holographic 3D Display System Based on Virtual Array Splicing of Spatial Light Modulator". The entire contents of each of these applications are incorporated herein by reference in its entirety.

TECHNICAL FIELD

The present disclosure relates to holographic display technology, and more particularly, to a holographic 3D display system based on virtual array splicing of a spatial light modulator.

BACKGROUND ART

The holographic display technology capable of reconstructing all wavefront information of the 3D object is considered as one of the most ideal 3D display methods, but due to limitation of the pixel size of the current spatial light modulator, the viewing visual area and the display size of the holographic reconstructed image based on a single spatial light modulator are quite small at present, which can hardly meet the viewing requirements. In order to solve this problem, researchers propose many solutions. For example, the space division multiplexing technology of using a plurality of spatial light modulators for curved surface splicing is used to obtain a large-visual-area holographic reconstructed image. Although this technology effectively enlarges the visual area of the holographic reconstructed image, the curved surface splicing of the plurality of spatial light modulators greatly increases the complexity and the cost of the system. In order to reduce the system complexity of splicing of a plurality of spatial light modulators, researchers expand the visual area of the holographic reconstructed image by continuously loading a plurality of sub-holograms for a single spatial light modulator and combining the time division multiplexing technology of structure light illumination. Although this solution reduces the cost, it has special requirements on the light source.

On the other hand, as the visual area and the size of the holographic reconstructed image have a mutual restriction relationship, it is quite difficult to expand both the visual area and the size of the holographic reconstructed image. In the aspect of expanding the size of the holographic reconstructed image, SeeReal Technologies in Germany manufactured a holographic 3D display system having a large-size display window of 300 mm×200 mm using the holographic optical elements. A research team from Warsaw University of Technology of Poland proposed a hologram algorithm capable of laterally enlarging, translating, and rotating the holographic reconstructed image, and finally produced a large-size color holographic reconstructed image of 50 mm×50 mm×100 mm. In addition, with the rapid development of metasurface technology in recent years, there are more and more solutions for expanding the size of the holographic reconstructed image by using the metasurface material, but the processing flows of materials specifically involved in the solutions are generally relatively complicated, and the material cost is relatively high, then the aspect of practicability of large-size holographic display needs to be further researched.

SUMMARY

The present disclosure provides a holographic 3D display system based on virtual array splicing of a spatial light modulator. As shown in FIG. 1, the system includes a laser, a first beam splitter, a second beam splitter, a first reflector, a shutter array, a spatial filter array, a solid lens, a first light beam deflection element, a spatial light modulator, a third beam splitter, a second light beam deflection element, and a second reflector, wherein the laser is configured to generate a coherent light beam. The first beam splitter, the second beam splitter, and the first reflector are configured to split the light beam generated by the laser into three parallel light beams to irradiate the shutter array. The shutter array is configured to control the three parallel light beams to sequentially pass therethrough according to a set time sequence. The three parallel light beams passing through the shutter array are expanded and collimated by the spatial filter array and the solid lens to form three parallel light beams with the same size and uniform intensity, i.e. a first light beam, a second light beam, and a third light beam. The first light beam deflection element is located in an outgoing direction of the three parallel light beams, and is configured to deflect respectively the first light beam, the second light beam, and the third light beam along three specific directions $\delta$, $\theta$, and $-\delta$ The first light beam deflection element and the second light beam deflection element are of the same model number. At a moment $T_1$, the shutter array is controlled to enable the first light beam to pass through the third beam splitter to irradiate the spatial light modulator, the diffraction light beam passes through the third beam splitter, the second light beam deflection element, and the second reflector, and a viewer sees the diffraction image of the spatial light modulator at the moment $T_1$; at a moment $T_2$, the shutter array is controlled to enable the second light beam to irradiate the spatial light modulator, the diffraction light beam passes through the third beam splitter, the second light beam deflection element, and the second reflector, and the viewer sees the diffraction image of the spatial light modulator at the moment $T_2$; at a moment $T_3$, the shutter array is controlled to enable the third light beam to irradiate the spatial light modulator, the diffraction light beam passes through the third beam splitter, the second light beam deflection element, and the second reflector, and the viewer sees the diffraction image of the spatial light modulator at the moment $T_3$. The diffraction image of the spatial light modulator at the three moments is controlled to be spliced seamlessly in space, and when a switching speed is sufficiently fast, the viewer sees the three diffraction images after the virtual array splicing of the spatial light modulator according to the effect of persistence of vision of human eyes.

The structures of the first light beam deflection element and the second light beam deflection element are as shown in FIG. 2. The first light beam deflection element and the second light beam deflection element each is formed by gluing two refracting prisms with a refractive index of n and a wedge angle of $\alpha$ and a piece of flat glass with a refractive index of n. The angle between the outgoing light beam and the optical axis is called as deflection angle. Taking the first light beam as an example, it can be seen through calculation according to the geometrical optical principle that the refractive index n, the incidence angle φ, the wedge angle α, and the deflection angle δ satisfy the following formula:

$$n \times \sin \varphi = \sin(\alpha + \delta) \quad (1)$$

It can be seen from formula (1) that under the premise of unchanged refractive index n and wedge angle α, the deflection angle δ only changes with the change of the incidence angle φ. By designing the wedge angle α, the refractive index n, and the incidence angle φ, the first light beam, the second light beam, and the third light beam pass through the first light beam deflection element and the third beam splitter, and then irradiate on a same area of the spatial light modulator. The first light beam, the second light beam, and the third light beam continue to propagate after being modulated by the spatial light modulator and passing through the third beam splitter, and irradiate on the second light beam deflection element. As the second light beam deflection element has completely the same optical properties as the first light beam deflection element, the three diffraction light beams form three parallel light beams again after passing through the second light beam deflection element.

When the switching speed of the shutter array is sufficiently fast, splicing effect of three parallel light beams is equivalent to spatially forming virtual array splicing of the spatial light modulator with a horizontal size of 3M×p and a vertical size of N×p, where M is the horizontal resolution (lateral resolution) of the spatial light modulator, N is the vertical resolution (axial resolution) of the spatial light modulator, and P is the pixel pitch of the spatial light modulator. Hence, the first light beam deflection element, the spatial light modulator, the third beam splitter, and the second light beam deflection element are equivalent to a virtual array of the spatial light modulator with the horizontal size of 3M×p and the vertical size of N×p.

The system provided in the present disclosure realizes large-visual-area holographic 3D display by the following method: as shown in FIG. 3, for a 3D object, a large-size hologram with the resolution of 3M×N using the hologram algorithms such as angular spectrum algorithm, the large-size hologram is averagely divided into three sub-holograms with the resolution of M×N along the direction of the horizontal resolution of the large-size hologram, the three sub-holograms being recorded as the sub-hologram 1, the sub-hologram 2, and the sub-hologram 3. At the moment $T_1$, the shutter array is controlled to make the first light beam pass therethrough, and meanwhile the sub-hologram 1 is loaded on the spatial light modulator; at the moment $T_2$, the shutter array is controlled to make the second light beam pass therethrough, and meanwhile the sub-hologram 2 is loaded on the spatial light modulator; at the moment $T_3$, the shutter array is controlled to make the third light beam pass therethrough, and meanwhile the sub-hologram 3 is loaded on the spatial light modulator; and when the switching is sufficiently fast, due to the effect of persistence of vision of human eyes, the viewer sees a large-visual-area reconstructed 3D object at the viewing distance R.

As shown in FIG. 4, in the holographic reconstruction process, when the virtual array of the spatial light modulator with a horizontal size of 3M×p is irradiated by the parallel light, the maximum diffraction angle θ satisfies the following formula:

$$\theta = \sin^{-1}\left(\frac{\lambda}{p}\right) \quad (2)$$

In the above, λ represents wavelength. According to holographic diffraction principle calculation, it can be known that the dimension D of the object satisfies the following formula:

$$D \leq \theta \times Z - 3M \times p \quad (3)$$

In the above, Z is the diffraction distance of the holographic reconstructed image. The holographic reconstructed image at the viewing distance R is analyzed based on a maximum size of the object, the visual area V' in which the complete holographic reconstructed image is visible is called as the effective visual area. By calculating diffraction positions of a highest point and a lowest point of the object, it is obtained:

$$V' = 3M \times p\left(\frac{2R}{Z} - 1\right) - \frac{\lambda}{p} \times R \quad (4)$$

In the conventional holographic display system, the single spatial light modulator is usually used for reconstruction, and when the viewing distance is R', the size of the effective viewing area is represented with V":

$$V'' = M \times p\left(\frac{2R'}{Z} - 1\right) - \frac{\lambda}{p} \times R' \quad (5)$$

Therefore, compared with the conventional holographic display system, when the diffraction distance and the viewing distance of the holographic reconstructed image are the same, the system realizes the expansion of the effective viewing area by more than 3 times.

The system provided in the present disclosure realizes large-size holographic 3D display by the following method: as shown in FIG. 5, for an object with the resolution of A×B, first, it is averagely divided along the horizontal resolution direction to obtain three sub-pictures of A/3×B, the three sub-pictures are respectively subjected to calculation using the hologram algorithms such as angular spectrum algorithm, to obtain three sub-holograms each with the resolution of M×N, the blazed grating is accordingly loaded for the three sub-holograms, a digital lens having a focal length of f is generated, the phase map of the digital lens is superimposed with the three sub-holograms respectively, to obtain the hologram 1, the hologram 2, and the hologram 3. At the moment $T_1$, the shutter array is controlled to make the first light beam pass therethrough, and meanwhile the hologram 1 is loaded on the spatial light modulator; at the moment $T_2$, the shutter array is controlled to make the second light beam pass therethrough, and meanwhile the hologram 2 is loaded on the spatial light modulator; at the moment $T_3$, the shutter array is controlled to make the third light beam pass therethrough, and meanwhile the hologram 3 is loaded on the spatial light modulator; and the above processes are cycled repeatedly, and imaging positions of various holographic reconstructed images are changed by changing the blazed grating of the holograms loaded on the spatial light modulator. When the switching is sufficiently fast (i.e. the switching time is sufficiently short), due to the effect of persistence of vision of human eyes, holographic reconstructed images of the three sub-pictures are seamlessly spliced in space, and the viewer sees a large-size holographic reconstructed image.

At the moment $T_1$, the size d of the holographic reconstructed image using a single spatial light modulator is:

$$d = \frac{f\lambda}{p} \quad (6)$$

When the switching is sufficiently fast, the size of holographic reconstructed image obtained by splicing of the hologram 1, the hologram 2, and the hologram 3 is 3d. Compared with the conventional holographic display system based on a single spatial light modulator, the system of the present disclosure realizes the expansion of the size of the holographic reconstructed image by 3 times.

Figure 1:
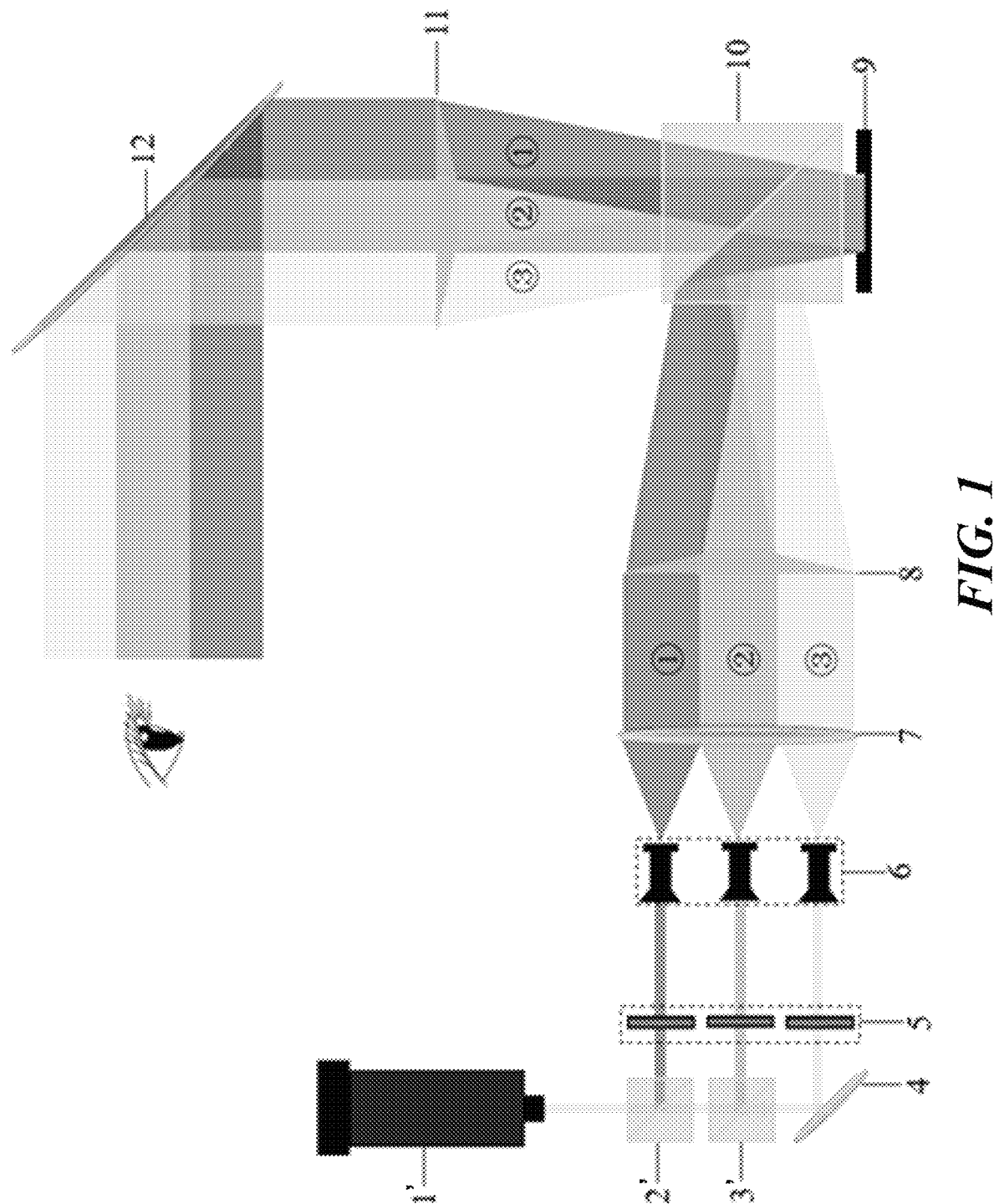
FIG. 1 is the structural schematic view of a holographic 3D display system based on virtual array splicing of a spatial light modulator.
Figure 2:
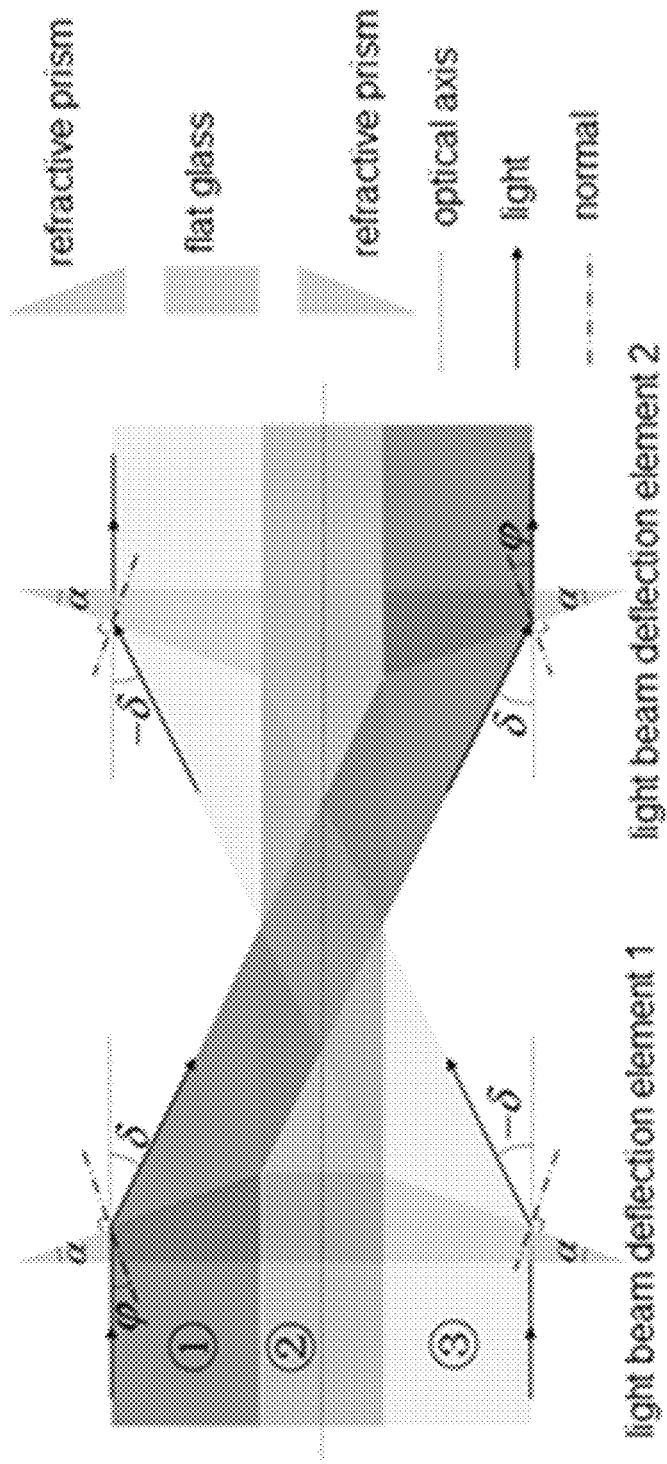
FIG. 2 is the structural schematic view of a light beam deflection element of the present disclosure.
Figure 3:
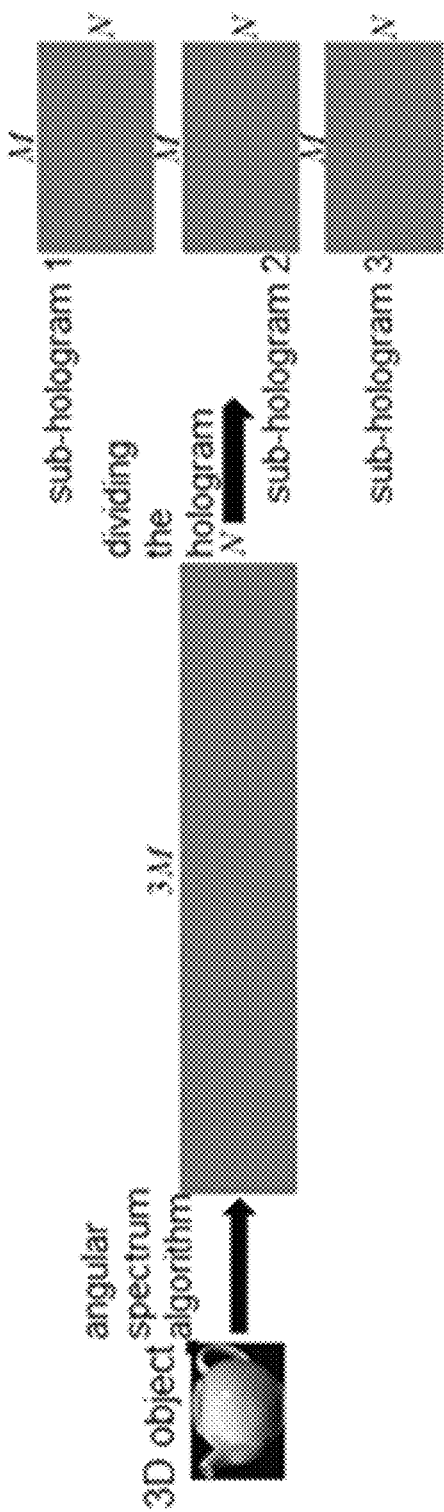
FIG. 3 shows a method for generating sub-holograms of large-visual-area holographic 3D display of the present disclosure.
Figure 4:
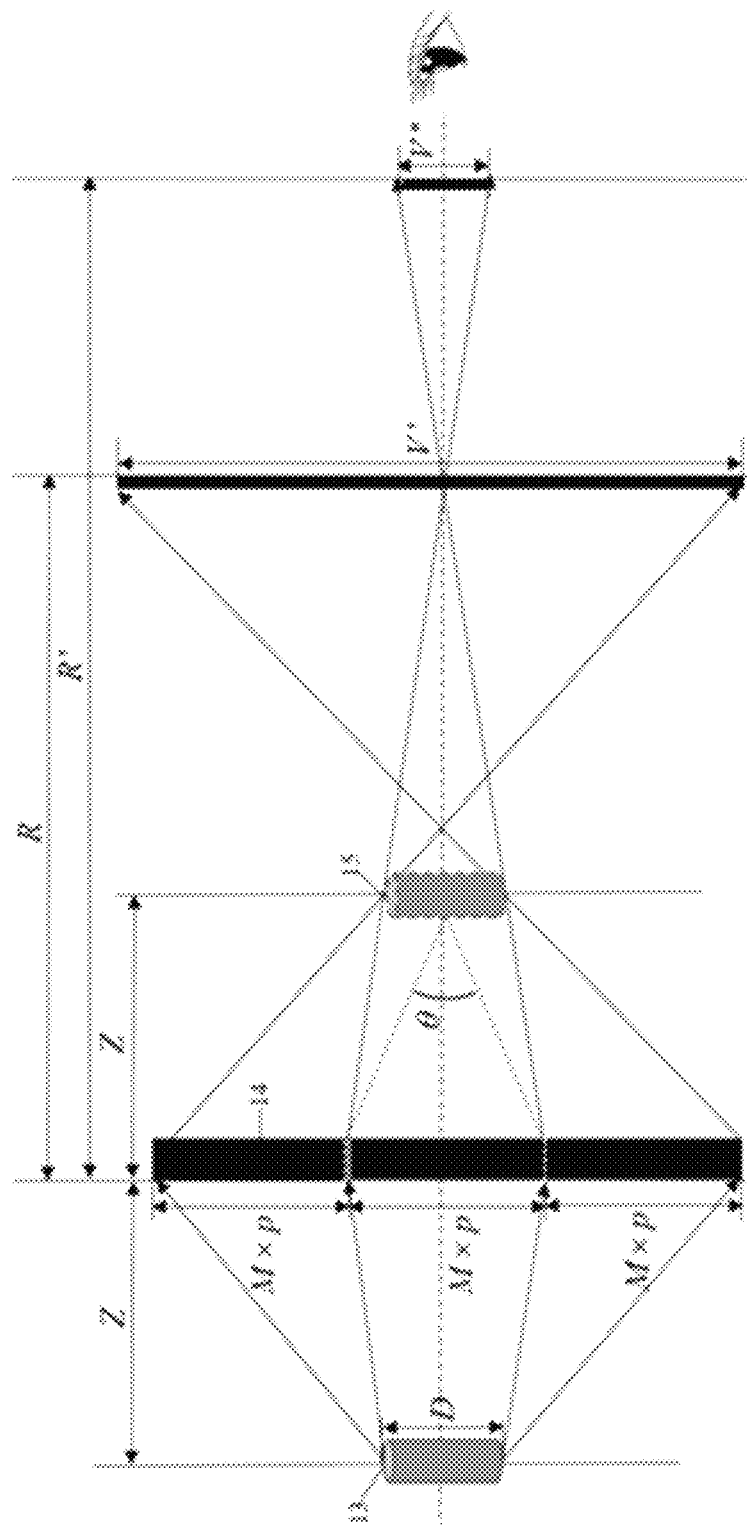
FIG. 4 is the principle diagram of large-visual-area holographic 3D display of the present disclosure.
Figure 5:
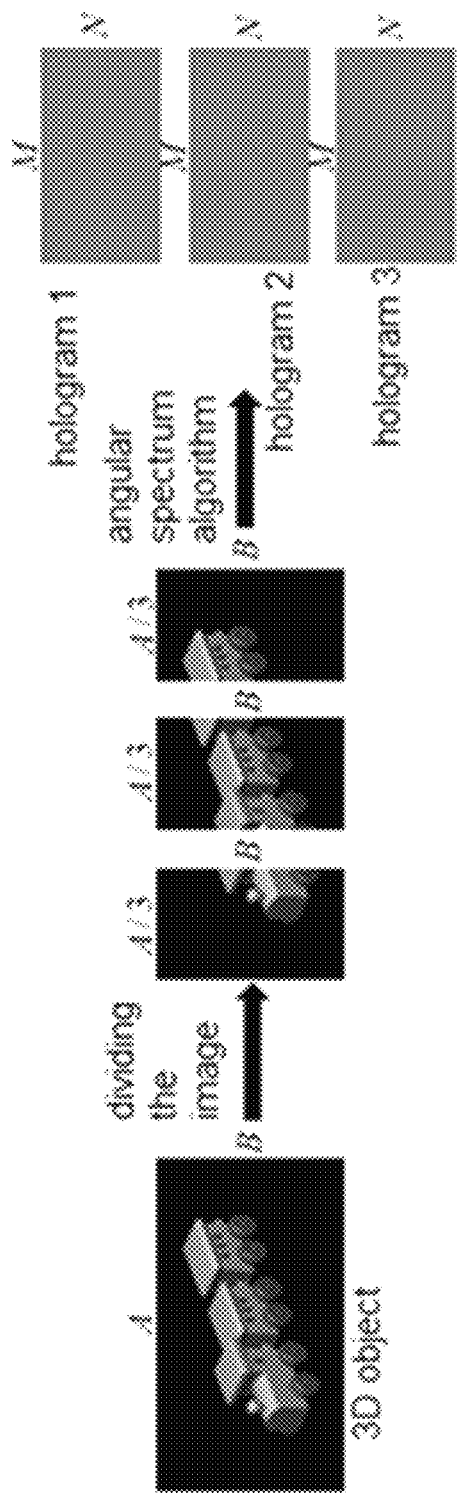
FIG. 5 shows a method for generating holograms of large-size holographic 3D display of the present disclosure.

Reference signs in various drawings above are as follows: (1') laser, (2') first beam splitter, (3') second beam splitter, (4) first reflector, (5) shutter array, (6) spatial filter array, (7) solid lens, (8) first light beam deflection element, (9) spatial light modulator, (10) third beam splitter, (11) second light beam deflection element, (12) second reflector, (13) 3D object, (14) 3M×N spatial light modulator, (15) holographic reconstructed image.

It should be understood that the above drawings are merely illustrative, but not drawn to scale.

DETAILED DESCRIPTION OF EMBODIMENTS

An embodiment of a holographic 3D display system based on virtual array splicing of a spatial light modulator provided in the present disclosure is illustrated in detail below to further describe the present disclosure. It is necessary to indicate herein that the following embodiments are merely used to further illustrate the present disclosure, but cannot be construed as limitation to the scope of protection of the present disclosure, and non-essential improvements and adjustments made by a person skilled in the art to the present disclosure according to the contents above still fall within the scope of protection of the present disclosure.

Relevant device parameters and structure parameters actually adopted by a system are as follows: the laser with wavelength of 532 nm; the solid lens with focal length of 300 mm; the first beam splitter and the second beam splitter with the size of 12.7 mm×12.7 mm×12.7 mm, and the third beam splitter with the size of 25.4 mm×25.4 mm×25.4 mm; the shutter array consists of three shutters of completely the same model number, and the light-emitting aperture of each shutter is 5 mm; and the spatial light modulator with pixel count of 1920×1080, size of 12.29 mm×6.91 mm, pixel pitch of 6.4 μm, and refresh speed of 60 Hz. The refractive prism with the refractive index of n=1.516, the wedge angle of α=4°, and the generated light beam deflection angle is δ=2°; the distance from the first light beam deflection element to the spatial light modulator is 400 mm; and the diffraction distance of the holographic reconstructed image is 200 mm.

In order to realize large-visual-area holographic 3D display, a "teapot" with the resolution of 320×240 is adopted as the recorded 3D object. A hologram with the resolution of 5760×1080 is generated through calculation using the angular spectrum algorithm, and the hologram is averagely divided into three sub-holograms with the resolution of 1920×1080 which are then loaded on the spatial light modulator in sequence. At a moment $T_1$, the first sub-hologram is loaded, and the shutters are controlled to make a first light beam pass therethrough; at a moment $T_2$, the second sub-hologram is loaded, and meanwhile the shutters are controlled to make a second light beam pass therethrough; at a moment $T_3$, the third sub-hologram is loaded, and meanwhile the shutters are controlled to make a third light beam pass therethrough. Due to the effect of persistence of vision of human eyes, a large-visual-area holographic reconstructed image of the "teapot" can be seen. Through calculation, when the viewing distance is 950 mm, the effective visual area has the size of ~234.4 mm. When the virtual array splicing of the spatial light modulator is not used, the effective visual area has the size of ~25.5 mm. The effective visual area is expanded by 9.2 times through the virtual splicing.

In order to realize the large-size holographic 3D display, a "train" with the resolution of 2160×1080 is adopted as the recorded 3D object. It is divided to give three sub-pictures with the resolution of 720×1080, and the focal length of the digital lens is set to 500 mm. Three holograms each with the resolution of 1920×1080 are obtained through calculation using the angular spectrum algorithm. At a moment $T_1$, the first hologram is loaded, and the shutters are controlled to make a first light beam pass therethrough; at a moment $T_2$, the second hologram is loaded, and meanwhile the shutters are controlled to make a second light beam pass therethrough; at a moment $T_3$, the third hologram is loaded, and meanwhile the shutters are controlled to make a third light beam pass therethrough; and the above processes are cycled repeatedly. Due to the effect of persistence of vision of human eyes, the holographic reconstructed image of the "train" has the size of 124.7 mm, which is expanded by 3 times compared with the size of the "train" holographic reconstructed image when the virtual splicing is not used.

What is claimed is:

1. A holographic 3D display system based on virtual array splicing of a spatial light modulator, wherein the system consists of a laser, a first beam splitter, a second beam splitter, a first reflector, a shutter array, a spatial filter array, a solid lens, a first light beam deflection element, a spatial light modulator, a third beam splitter, a second light beam deflection element, and a second reflector, wherein the laser is configured to generate a coherent light beam; the first beam splitter, the second beam splitter, and the first reflector are configured to split the light beam generated by the laser into three parallel light beams to irradiate the shutter array; the shutter array is configured to control the three parallel light beams to sequentially pass therethrough according to a set time sequence; the three parallel light beams passing through the shutter array are expanded and collimated by the spatial filter array and the solid lens to for a first light beam, a second light beam, and a third light beam, which with the same size and uniform intensity, the first light beam deflection element is located in an outgoing direction of the three parallel light beams, and is configured to deflect respectively the first light beam, the second light beam, and the third light beam along three specific direction, wherein at a time $T_1$, the shutter array is controlled to enable the first light beam to pass through the third beam splitter to irradiate the spatial light modulator, a first diffraction light beam, obtained by diffraction of the first light beam from the spatial light modulator, passes through the third beam splitter, the second light beam deflection element, and the second reflector, and a viewer sees a diffraction image of the spatial light modulator at the time $T_1$; at a time $T_2$, the shutter array is controlled to enable the second light beam to irradiate the spatial light modulator, a second diffraction light beam, obtained by diffraction of the second light beam from the spatial light modulator, passes through the third beam splitter, the second light beam deflection element, and the second reflector, and the viewer sees the diffraction image of the spatial light modulator at the time $T_2$; at a time $T_3$, the shutter array is controlled to enable the third light beam to irradiate the spatial light modulator, the third diffraction light beam, obtained by diffraction of the third light beam from the spatial light modulator, passes through the third beam splitter, the second light beam deflection element, and the second reflector, and the viewer sees the diffraction image of the spatial light modulator at the time $T_3$; and the diffraction image of the spatial light modulator at the three moments is controlled to be spliced seamlessly in space, wherein when a switching happens, the viewer sees the three diffraction images after the virtual array splicing of the spatial light modulator according to an effect of persistence of vision of human eyes.

\* \* \* \* \*